July 19, 1966 L. T. ANDERSON ETAL 3,261,923

FREQUENCY-SHIFT DIAL PULSING SYSTEM

Filed Dec. 28, 1962 7 Sheets-Sheet 1

INVENTORS L. T. ANDERSON
I. DORROS
J. C. EWIN
L. J. GITTEN
Q. D. GROVES
J. R. HARRIS

BY J. P. Kearns
ATTORNEY

FREQUENCY-SHIFT DIAL PULSING SYSTEM

Filed Dec. 28, 1962 7 Sheets-Sheet 4

FREQUENCY-SHIFT DIAL PULSING SYSTEM

United States Patent Office 3,261,923

Patented July 19, 1966

3,261,923

FREQUENCY-SHIFT DIAL PULSING SYSTEM

Lynn T. Anderson, Gahanna, Ohio, and Irwin Dorros, Livingston, James C. Ewin, Colonia, Lawrence J. Gitten, Ocean Township, Monmouth County, Quentin D. Groves, Berkeley Heights, and James R. Harris, Rumson, N.J., assignors to Bell Telephone Laboratories, Incorporated, New York, N.Y., a corporation of New York Filed Dec. 28, 1962, Ser. No. 248,128
15 Claims. (Cl. 179—18)

This invention relates generally to the transmission of called number address information between telephone central offices and specifically to a high-speed, frequency-shift, narrow-band transmission system therefor.

In the copending application of J. O. Edson and L. C. Thomas, Serial No. 248,127, filed of even date herewith, a carrier terminal for a multichannel data trunking system for use in connection with voice-band telephone transmission facilities is disclosed. In the data trunking system up to six data message channels are multiplexed together with a time-division supervisory signaling channel on a single four-wire, voice-frequency toll telephone trunk facility. The effective data channel bandwidth is held to two hundred cycles. It is desired to transmit call progress and call address signals over these individual narrow-band channels for the purpose of setting up and taking down calls as rapidly as possible. It is believed that the average holding time for a data call will be in the order of ten seconds in contrast with the average three-minute voice call. Therefore, the call set-up time must desirably be reduced as much as possible.

In the above-mentioned patent application there is disclosed a time-division multiplex system for exchanging duplex E and M supervisory signals between terminating offices for the data trunking system. There remains, however, the problem of transmitting call address information, that is, information resulting from subscriber dialing of a called telephone number, from the originating to the terminating offices and of transmitting a dial-start signal from the terminating to the originating office. Dial pulses are customarily generated on a direct-current basis. Direct-current signals, however, as is well known, cannot be transmitted over toll or long-distance circuits directly because of the effective low-frequency cut-off of telephone-grade transmission facilities at about 250 cycles.

Conventional solutions to this problem have employed single and multifrequency systems. The single frequency system uses on-off pulsing of either 2400- or 2600-cycle tones in the voice-frequency band. These frequencies are incompatible, however, with the carrier and channel frequencies established for the data trunking system disclosed in the cited Edson et al. patent application. The single-frequency signals are also transmitted in on-off amplitude modulation form at dial-pulse speeds of the order of ten pulses per second. Transient problems prevent increase of the transmission speed to the level attained in the system of this invention.

The multifrequency key-pulsing system, on the other hand, employs paired combinations of the odd hundred cycle frequencies extending from 700 to 1700 cycles. Thus, at least a third of the voice-frequency band is required for the transmission of such signals. The multifrequency system is therefore incompatible with the narrow-band channels of the data trunking system. What is needed is a system for dial-pulsing which is fast in operation and compatible with frequency bandwidth requirements and frequency allocations of the data trunking system.

It is, accordingly, an object of this invention to transmit call address information between telephone central offices over toll facilities within a narrow frequency band.

It is a further object of this invention to transmit dial-start signals between telephone central offices over toll facilities within a narrow frequency band.

It is another object of this invention to transmit call address digits between outgoing senders and incoming registers in a toll telephone trunking system at speeds of the order of 33⅓ digits per second in narrow-band channels and at even higher speeds in channels with more bandwidth.

It is still another object of this invention to coordinate the transmission of call address information between telephone central offices with supervisory call-status signals in an expeditious manner.

It is yet another object of this invention to complete a running error check of transmitted call address digits and to request an automatic retransmission of all address digits if any is found to be in error.

According to this invention, an outgoing sender circuit at the originating central office end of a telephone toll transmission system and an incoming register at the terminating central office of a telephone toll transmission system are arranged to provide for the translation of call address digits from a two-out-of-six parallel code to a two-out-of-six synchronous serial binary data train with no interdigital time lost and back again and to transmit the binary data train as a frequency-shift keyed signal. In addition, from the terminating end of the transmission system a single-frequency tone is returned as a dial-start and error-present signal. The frequency-shift pulse train and the single-frequency tone are suitable for transmission in opposite directions over any one of the narrow-band channels of the toll transmission system.

The transmitting circuit associated with an outgoing sender circuit of the type used in No. 5 crossbar common control switching systems comprises a serial encoder and a modulator. The serial encoder alternately scans two sets of six leads emanating from the sender circuit proper. Each set of six leads contains a coded dial digit in two-out-of-six parallel form. The encoder samples each set of sender leads alternately to form a serialized binary data train without interdigital spacing. The encoder also prefixes the data train representing a complete called number with a unique start signal presented as the first digit by the sender. In order to develop maximum scanning speed the encoder scans one set of digit leads while the sender circuit is setting up a fresh digit on the other set of leads. The scanning operation is precisely timed by a local clock source.

The modulator in the transmitting circuit converts the binary data train from the encoder into a frequency-shifted signal centered on a frequency within the voice-frequency band. Included with the modulator is a detector for the single-frequency dial-start signal.

The receiver circuit associated with an incoming register circuit comprises a demodulator, a serial decoder, including a start-signal detector and an error detector, and a single-frequency tone generator. The demodulator converts the incoming frequency-shift signals to a binary data train using slicing techniques. The decoder operates on the demodulated data train to form parallel direct-current two-out-of-six digit character representations on two alternate sets of six leads each for connection to the register circuit. In the process timing signals are recovered from the data train to control steering and gate relays in the register circuit. In addition, an error check is made on each digit. The single-frequency tone generator is equipped to send the dial-start signal to the originating end of the toll facility. The dial-start signal is transmitted until the complete call address has been registered. If no errors are detected, the signal is removed at the end of the call address. An error is indicated by continuing the tone transmission.

An important feature of this invention is the separation of successive digits at both the sender and register ends of a signaling connection into odd and even groups in order to speed up the sampling process. In accordance with this feature relatively slow-acting electromagnetic relays in sender and register circuits can be retained therein and yet be compatible with the inherent speed capabilities of an electronic scanning system, because a full digit time is allowed for setting up each group.

Another feature of this invention is the combination of solid-state electronic scanning and frequency-shift transmission which requires only a narrow transmission band. In accordance with this feature at least six signaling circuits can be accommodated in a single voice-frequency band.

A further feature of this invention is the provision for automatic retransmission of call address digits received in error.

A still further feature of this invention is the application of electronic digital logic circuits to the control of call address signaling in a telephone system.

Still another feature of this invention is the method of encoding a complete called number into a continuous data train with only one start code per address.

The above and other objects and features of this invention will be appreciated more fully by a consideration of the following detailed description taken together with the drawing in which.

*General*

Figure 1:
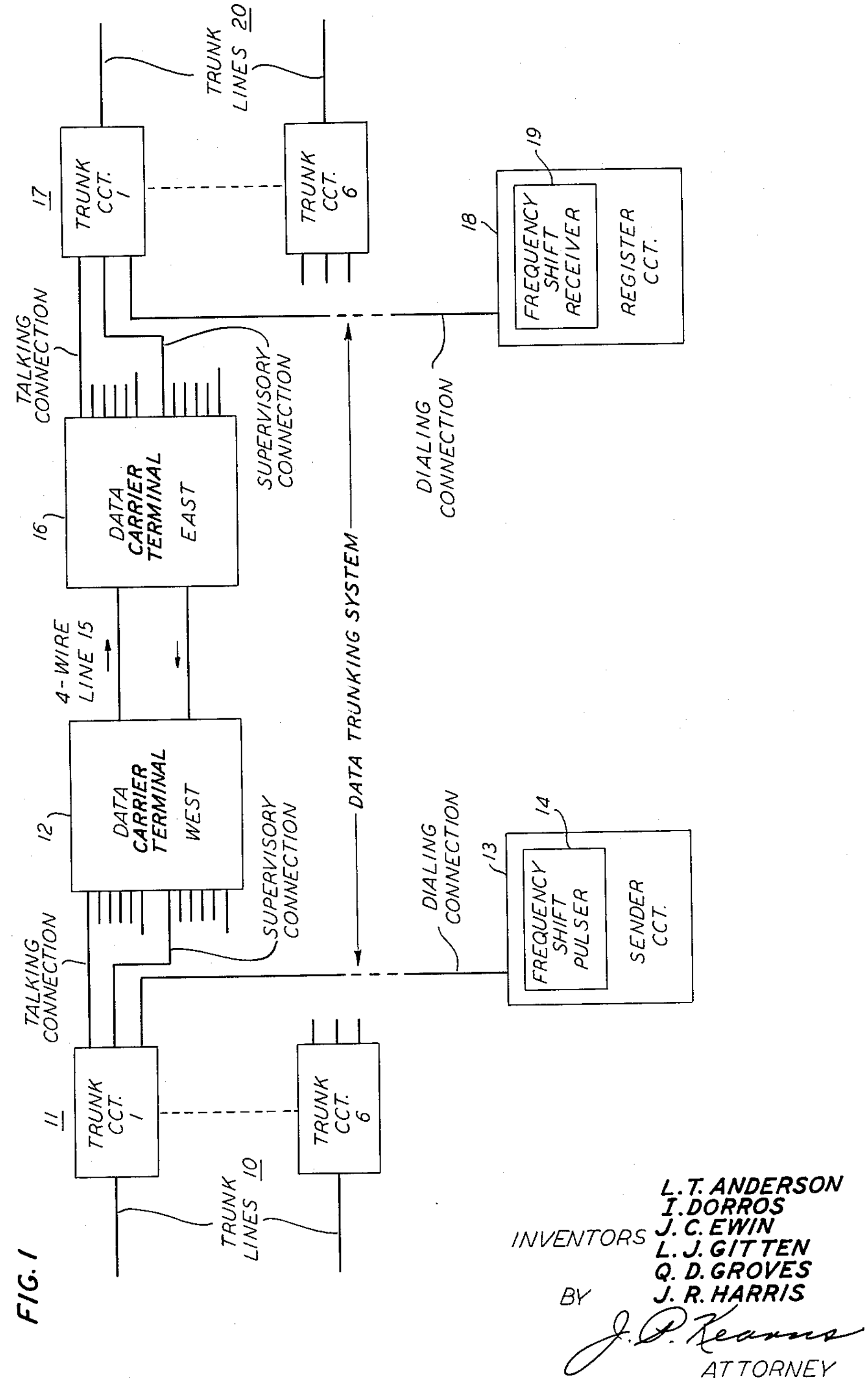
FIG. 1 is an overall block diagram of an illustrative embodiment in which the frequency-shift pulsing system of this invention has particular utility.

FIG. 1 shows in functional block form an illustrative embodiment of a data trunking system, as described in the aforementioned Edson et al. patent application, to which the frequency-shift pulsing system for call address signaling is most advantageously applied. The data trunking system comprises elements necessary for deriving six narrow-band data channels from a single four-wire, voice-band telephone toll facility. Such a facility, indicated here as four-wire line 15, provides independent transmission paths for east-to-west and west-to-east two-way communication between telephone toll central offices. All the elements to the left of the center of the figure are advantageously located in a west central office and all the elements to the right of center, in an east central office.

Individual trunk lines 10 lead off to the left through a conventional two-wire telephone switching system (not shown) to a data subscriber location and each occupies a full voice band. Similarly, trunk lines 20 on the right lead off to connecting data subscribers or trunks through another conventional telephone switching system (not shown). Conventional trunk circuits (six per toll transmission facility are indicated) 11 and 17 connect to each of trunk lines 10 and 20. Conventional E and M composite supervisory (line status) signaling is used over the lead marked "supervisory connection." Further associated with the west (originating) office is outgoing sender circuit 13 which services all trunk circuits 11 on a demand basis for receiving the called number information from a calling subscriber and translating this information into a form for establishing and controlling a through connection to the called subscriber. The sender is common equipment which through sender links (not shown) is connectable under the control of a marker (not shown) to any trunk circuit requiring service through the lead marked "dialing connection." The dashed portion of this lead indicates the switching and control link. Associated with the east (terminating) office is incoming register circuit 18 for receiving called number information and supervising the completion of through connections to the called subscriber. The register is also common equipment which through register links (not shown) is connectable to any trunk circuit through the lead marked "dialing connection." The dashed portion of this lead indicates the switching and control link.

Data carrier terminals 12 and 16 multiplex frequency-shift data signals from each trunk circuit into narrow-frequency bands on four-wire line 15. The leads designated "talking connection" carry the data signals to be multiplexed. There is one for each trunk circuit. The term "talking" is a gloss which is strictly valid only from the viewpoint of the trunk circuit. It indicates the connection over which intelligence signals are transmitted, since speech at the present state of the art cannot be compressed into a 200-cycle frequency band.

Data carrier terminals 12 and 16 also derive a supervisory signaling channel from the voice-frequency band of line 15 adjacent to the data channels and transmit line status (on-hook and off-hook) information in both directions on a time-division basis. E and M lead connections are made for this purpose to each trunk circuit on the leads designated "supervisory connection."

The data trunking system is designed to work with data sets as described in the joint patent application of T. L. Doktor, G. Parker, L. A. Weber and H. M. Zydney Serial No. 141,672, filed September 29, 1961, now U.S. Patent No. 3,113,176, granted December 3, 1963. At the originating end of a connection these data sets originate on 1170 cycles (so-called $f_1$ band) and receive on 2125 cycles (so-called $f_2$ band). At the terminating end of a connection these data sets exchange bands and transmit on 2125 cycles and receive on 1170 cycles.

The sender 13 and register 18 normally require the whole voice band in transmitting dial pulses and dial go-ahead signals. It is the purpose of this invention, however, to make the signals transmitted between sender and register compatible with the nominal 200-cycle bandwidth available in each channel of a multichannel data trunking system. For this reason sender 13 is shown in FIG. 1 to include a frequency-shift pulser 14 and register 18, to include frequency-shift receiver 19. These frequency-shift units comprise encoder and decoder elements for handling complete called number information as a binary data train, the marks and spaces of which are transmitted respectively as plus and minus 100-cycle frequency shifts about the nominal channel carrier frequencies of the data trunking system. In this way called number information can be sent over the narrow-band data channels independently of each other during the call set-up time.

Outgoing sender 13 is of the type described in the joint patent application of L. T. Anderson and C. E. Kress, Serial No. 166,328, filed January 15, 1962, now U.S. Patent No. 3,125,642, granted March 17, 1964. This application discloses a high-speed steering circuit for a No. 5 crossbar common control switching system in which digits for outpulsing are presented on alternate lead sets or rails in binary-coded form.

Incoming register 18 employs the same type of alternate-rail steering system for accepting incoming call address digits as the sender disclosed in the L. T. Anderson et al. application just mentioned. In addition, both register and sender perform all the basic logic decisions and timing functions of conventional registers and senders. The operation of the sender and register proper forms no part of this invention.

In order for either the east or west terminal to originate calls an identical sender can be located at the east terminal and an identical register, at the west terminal.

*Frequency-shift pulser*

Figure 2:
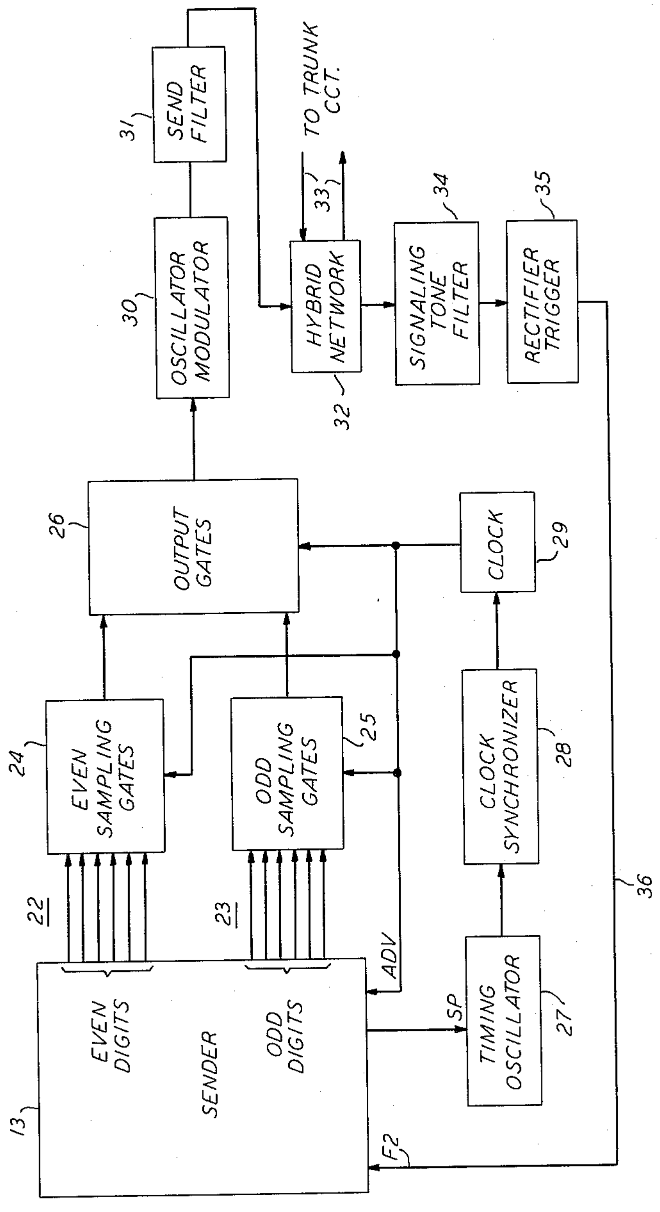
FIG. 2 is a block diagram of the sending end of the frequency-shift pulsing system of this invention.

FIG. 2 is a block diagram of the frequency-shift pulser indicated in FIG. 1 as block 14. Sender circuit 13 is shown only in its broad aspect as a source of call-address digits emitted on command from the frequency-shift pulser by way of parallel-lead sets generally designated 22 and 23. An advance signal on the lead designated ADV requests the alternate presentation of successive digits on leads 22 and 23. The frequency-shift pulser comprises a serial encoder encompassing sampling gates 24 and 25, output gates 26, timing oscillator 27, clock synchronizer 28 and clock 29; a frequency-shift modulator 30 and its associated sender filter 31; and a return signal detector including filter 34 and rectifier trigger 35. A directional connection between modulator 30 and signaling tone filter 34 to trunk circuit lines 33 is provided through a conventional hybrid network 32. Lines 33 provide a two-way connection into a trunk circuit 11 in FIG. 1 for baseband signals to and from the data carrier terminal. Lines 33 are indicated generally in FIG. 1 as the dialing connection. In the trunk circuit the signals on lines 33 are coupled to the "talking" connection leads of the interoffice terminal, which may include the data carrier terminal, where translation to the appropriate data channel is effected.

The serial encoder accepts call address information on the two sets of six leads 22 and 23 from the sender circuit proper and serializes the information for the entire address. The serialized information is keyed out synchronously by oscillator-modulator 30 at the rate of 200 bits per second in sequential blocks of six bits per character. Each sequential block contains six five-millisecond bit intervals and by the proper choice of level for those bits (either ground "one" or +5 volts "zero"), each of the digits from zero through nine and a number of special signaling characters are encoded on a two-out-of-six basis.

The first character transmitted for each address is designated KP (for key-pulse from multifrequency signaling nomenclature). The last character is designated ST (for start, since this signal starts the register to hunting for an idle trunk) and may be one of two characters to indicate regular or special service, for example. Up to ten address digits may be transmitted so that there can be up to twelve address characters. This corresponds to a pulsing time of 0.36 second for a ten-digit number.

All the characters are generated in the sender as described in the aforementioned Anderson et al. patent application.

The code used in an actual system is shown in Table I below and is similar to that used in multifrequency keypulsing systems.

TABLE I

| Bit Pos. | Bit Weight | Transmitted Characters | | | | | | | | | | | | |
|---|---|---|---|---|---|---|---|---|---|---|---|---|---|---|
| | | 0 | 1 | 2 | 3 | 4 | 5 | 6 | 7 | 8 | 9 | KP | 1–10 ST | 7–10 ST |
| 1 | 0 | --- | X | X | --- | X | --- | --- | X | --- | --- | X | --- | --- |
| 2 | 1 | --- | X | --- | X | --- | X | --- | --- | X | --- | X | X | --- |
| 3 | 2 | --- | --- | X | X | --- | --- | X | --- | --- | X | X | --- | --- |
| 4 | 4 | X | --- | --- | --- | X | X | X | --- | --- | --- | X | --- | --- |
| 5 | 7 | X | --- | --- | --- | --- | --- | --- | X | X | X | --- | --- | X |
| 6 | 10 | --- | --- | --- | --- | --- | --- | --- | --- | --- | --- | X | X | X |

An "*x*" in the table indicates a ground or "one" in the particular bit interval of a six-interval signaling block. According to the bit designation each digit, except zero (chosen arbitrarily), is obtained by adding the bit designations containing a ground signal. All the characters except KP, require only two bits. Only the KP and ST characters include a bit in the sixth position.

The KP character is unique and prepares the receiver for the incoming synchronous data train. The two ST characters indicate that all digits have been passed. Two different classes of service can be indicated by the two available ST characters.

Operation of the serial encoder is initiated when the sender circuit places a ground ("one") on the SP lead. At this time the continuously running timing oscillator 27, having a 200-cycle square-wave output, is gated to clock synchronizer 28, which has held clock 29 in an idle reset state. Clock 29, once started, furnishes sampling pulses to the odd and even sampling gates 24 and 25 and output gates 26. The sampling pulses serialize the digit information on the parallel leads from the sender. The output gates couple the serialized information to oscillator-modulator 30.

Clock 29 also provides ADV (Advance) signals to the sender circuit to have each successive digit set up on the correct set of leads 22 or 23. The first character (KP) is counted as an even digit (the zero-th digit) and is always presented by the sender on the even lead set or rail. Subsequent digits are odd or even accordingly. Oscillator-modulator 30 accepts the serial binary train from the output gates and converts it into a frequency-shifted signal which deviates at the binary data rate ±100 cycles about an 1170-cycle center frequency, which is compatible with the frequency used in the trunk circuit for message data signals. Therefore, the data carrier terminal when used can translate this to the proper data channel as though it were message data. Oscillator-modulator 30 may conveniently and advantageously be a Hartley oscillator having a tank circuit into which an additional inductance can be switched according to whether the signal bit to be transmitted is ground or positive above ground. Send filter 31 is conventional and serves to restrict the frequencies contained in the oscillator output to the signaling band.

Signaling tone filter 34 and rectifier trigger 35 together form a detector for a 2025-cycle tone returned by the register circuit as an alternating-current dial-start signal in response to an off-hook signal from the originating office. Filter 34 is tuned to the expected frequency and can include a limiting amplifier. The filter output is rectified in rectifier trigger 35 by conventional means including the well known Schmitt trigger circuit. The output appears to the sender circuit on the lead F2 as either a ground or open circuit depending on the presence or absence of the signaling tone.

Hybrid network 32 is a conventional three-winding transformer arrangement with appropriate balancing networks for separating into two one-way signal paths oppositely directed signals on a two-wire line without mutual interference.

*Frequency-shift receiver*

Figure 3:
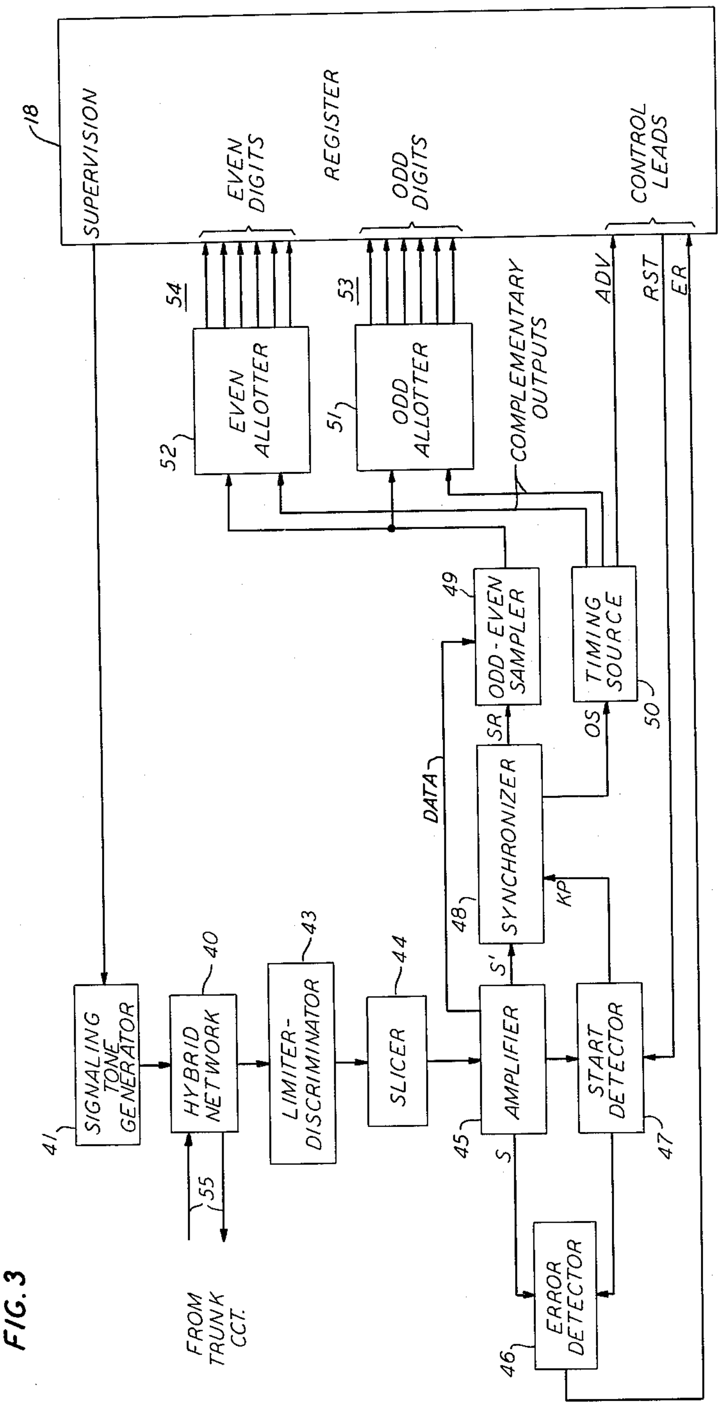
FIG. 3 is a block diagram of the register or receiving end of the frequency-shift pulsing system of this invention.

FIG. 3 is a simplified block schematic diagram of a frequency-shift receiver according to this invention and represents a practical embodiment for block 19 in FIG. 1. The frequency-shift receiver receives synchronously coded characters of the type generated by the frequency-shift pulser of FIG. 2 in the form of frequency-shift keyed signals from a trunk circuit, such as is designated 17 in FIG. 1, and converts these signals into direct-current pulses to operate appropriate relay combinations in a register circuit. The input to this receiver is connected through the lead designated "dialing connection" in FIG. 1, thence through the trunk circuit internal connections to one of the "talking connection" leads to the east terminal of the interoffice transmission facilities, which may include the data carrier terminal. For return signaling a signaling tone generator, controlled by the register circuit, is also included.

The frequency-shift receiver of FIG. 3 comprises a demodulator including limiter-discriminator 43, slicer 44 and amplifier 45; a serial decoder including error detector 46, start detector 47, synchronizer 48, odd-even sampler 49, timing source 50 and odd and even allotters 51 and 52; signaling tone generator 41; and hybrid network 40.

Signals from the trunk circuit are connected to hybrid network 40 through leads 55. Hybrid network 40, similar to hybrid network 32 in FIG. 2, separates incoming and outgoing signals into two separate paths and delivers the former to limiter-discriminator 43. The input to the limiter is a frequency-shift signal in which 1270 cycles indicates a space or zero and 1070 cycles indicates a mark or one. The limiter portion removes amplitude variations from the incoming signal in a conventional manner. The discriminator portion converts frequency changes to voltage changes in any well known manner. For example, the discriminator can include circuits resonant at each of the mark and space frequencies. The outputs of the resonant circuits are rectified and combined in such a way as to produce a net positive voltage for 1270-cycle inputs and a net negative voltage for 1070-cycle inputs. A clean square wave for application to slicer 44 is thus formed. The slicer essentially clamps this square wave to ground using the well known Schmitt trigger circuit. The output of the slicer is therefore a square wave with positive output for "zero" signals and ground for "one" signals. Amplifier 45 is essentially a buffering arrangement for distributing the slicer output to error detector 46, start detector 47, synchronizer 48 and odd-even sampler 49.

The serial decoder, driven by the demodulator described above, receives the synchronous binary data train at a rate of 200 bits per second. This data train is divided into sequential blocks, each of which contains six five-millisecond bit intervals. Each coded block represents a coded character with a duration of 30 milliseconds. For each bit interval the data will be in the marking or "one" state, denoted by ground, or in the spacing or "zero" state, denoted by five volts positive. The successive bit intervals are designated as indicated in Table I above.

The functions of the serial decoder are: (1) to derive timing signals for controlling steering and gate relays in the register circuit so that digit information is delivered to a correct register location, (2) to recover the digit information in the synchronous binary data train from the demodulator and present this information to the register circuit on alternate odd and even set of six leads as parallel, direct-current signals, and (3) to check the data train for unallowable code characters.

The decoder is normally disabled until a ground is placed on the RST (receiver start) lead by the register circuit 18 after it has sent a dial-start signal to the sender circuit. Start detector 47 is thereby enabled and searches for a continued marking state for at least three and a half bit intervals. Only the KP character has this characteristic. Once this character is recognized start detector 47 enables synchronizer 48, which proceeds to generate sampling pulses at the center of each bit interval, on lead SA. The synchronizer itself is synchronized with the space-to-mark transitions at the end of the KP character and in the incoming data train. Another output OS of the synchronizer drives timing source 50, which generates control signals for controlling the odd and even allotters 51 and 52 to effect the proper serial-to-parallel distribution to odd and even lead sets 53 and 54. Another output from the timing source is delivered to the register on the ADV (advance) lead at the end of each character to cause the register to read out the correct odd or even digit. At the end of the complete number the ST character is recognized by the register which removes ground from the RST lead, and disables start detector 47 and synchronizer 48.

Each character is checked in error detector 46 for the presence of two and only two marking bits per character. On the failure of this check an output appears on lead ER (error) which informs the register of this failure. The register is arranged to respond to this signal by disabling signaling tone generator 41, provided no error is found in any digit of the call address. In the event of an error, however, the signaling tone generator is not disabled and the sender circuit interprets this as a signal to retransmit the complete called number. At the same time in the error-detected situation ground is withdrawn from the RST lead so that the decoder will wait for another KP character and all storage relays in the register are reset. After a check failure on the second trial, the register is arranged to disable the signaling tone generator, but recognize the failure and not use the erroneous call address. The sender, after recognizing the second failure, calls for a reorder.

Signaling tone generator 41 is a single-frequency oscillator capable of being keyed to the trunk circuit through hybrid network 40 in a conventional manner.

*Serial Encoder*

Figure 4:
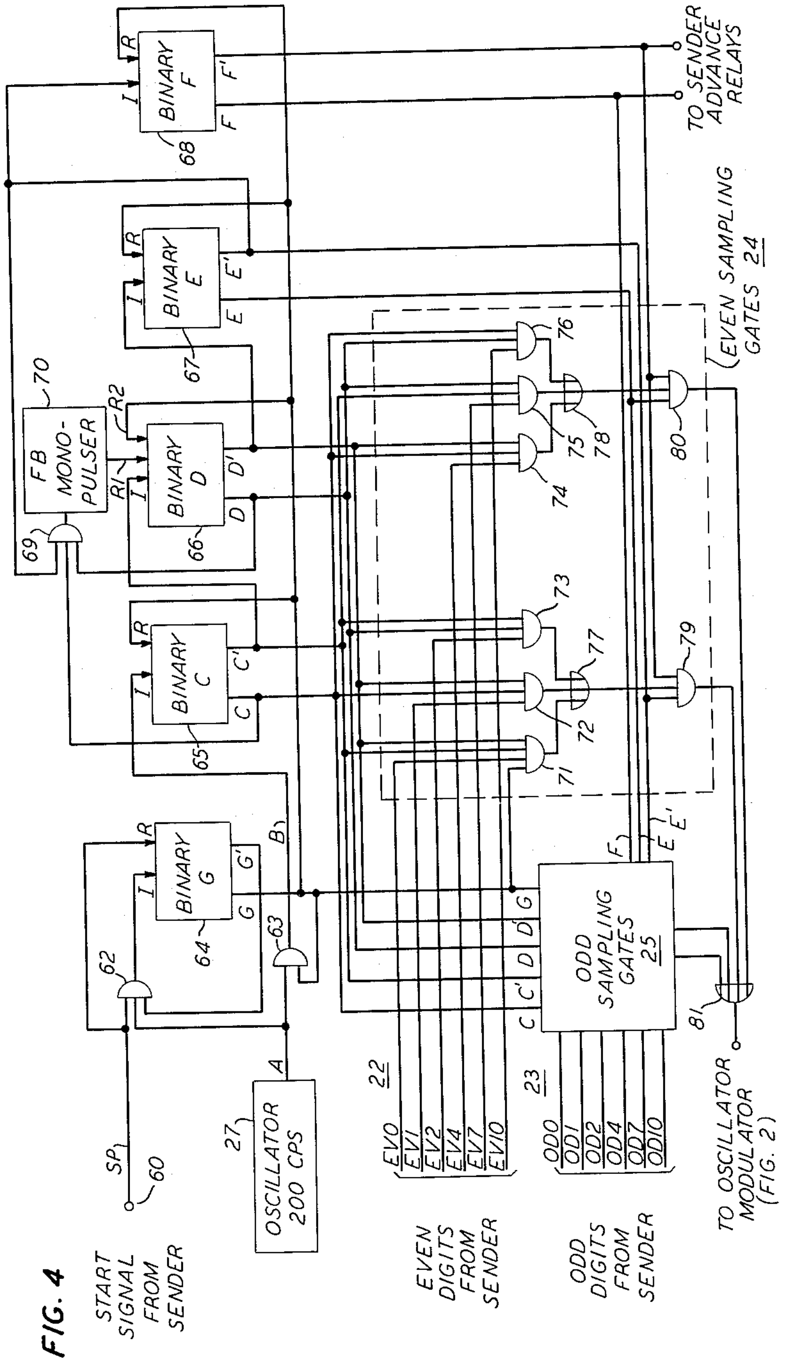
FIG. 4 is a more detailed block schematic diagram of the scanning and sampling logic and encoder circuits in the sending end of the frequency-shift pulsing system of this invention.

FIG. 4 is a more detailed block diagram of an illustrative embodiment of the serial encoder broadly described above in connection with the consideration of FIG. 2. The serial encoder makes effective use of transistor-resistor logic functional circuit packages, such as, binary cells, monopulsers and coincidence gating circuits. The basic circuit package is the coincidence gate employing a single n-p-n transistor with emitter electrode grounded. The collector electrode is connected through a load resistor to a positive voltage supply. One or more input signals are applied through isolating resistors to the base electrode. A positive voltage on any input saturates the transistor and thereby grounds the collector electrode. If all inputs are at ground, the transistor is cut off and the collector is at a positive potential. A single transistor with a single input can therefore act as an inverter. A single transistor with multiple inputs can perform a negative AND or coincidence function, producing an output when all inputs are off. The negative OR or buffer function can also be realized interpreting the output state differently, that is, removal of an output indicates at least one input is on. Gate circuits performing either the negative AND or OR function are symbolized by a semi-circle. The OR-function is indicated by extending the leads inside the semi-circle.

A binary cell is formed when two transistor gates as just described are cross-coupled collector to base and a diode pulse steering network is added to the base circuits so that negative-going pulses are directed to cut off the saturated transistor and reverse the state of the formerly cut-off transistor. The binary cell forms a divide-by-two circuit when driven by a continuous pulse train. Such a cell is designated "binary" in FIG. 4.

These cells can also have additional inputs applied directly (independent of the steering network) to either base electrode and these inputs are called set (S) and reset (R) inputs. The collector outputs are arbitrarily designated as "one" (unprimed letter) and "zero" (primed letter).

A monopulser is a monostable multivibrator which produces an output pulse of preset duration whenever it is triggered by an input pulse of the proper polarity. It consists of a pair of gate transistors with a capacitive coupling between the collector electrode of one transistor and the base electrode of the other. The remaining collector and base electrodes are resistively coupled as in the binary cell. When triggered by a positive pulse, a positive output is obtained at the collector electrode of the one transistor. The duration of the output is determined by the value of the capacitor.

These logic packages are well known in the art and the transistor embodiments briefly described above are only one family of several for implementing these packages.

In the serial encoder of FIG. 4 oscillator 27 is free-running at a nominal 200 cycles per second. It includes a squaring amplifier so that its output is a square wave. This oscillator determines the five-millisecond bit intervals in which the called digits are encoded. Coupling the oscillator output into the remainder of the encoder is a clock synchronizer comprising binary 64, also designated G, and coincidence or AND-gates 62 and 63.

Figure 6:
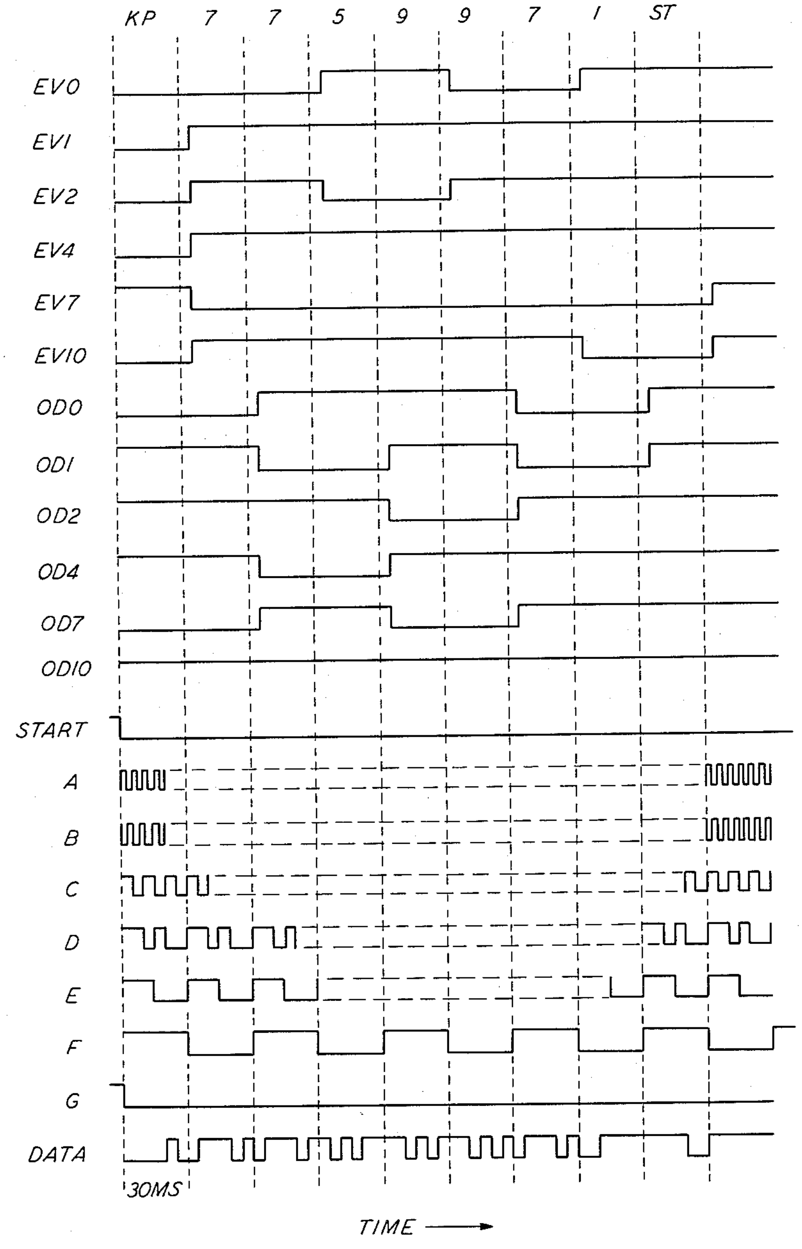
FIG. 6 is a waveform diagram of use in understanding the operation of the encoder shown in FIG. 4.

Binary G has a complementing input I and a reset input R, as well as complementary outputs G and G′. The A lead is constantly providing a square wave output A as shown on the waveform diagram of FIG. 6 applied to an input of both gates 62 and 63. As soon as ground is placed on terminal 60 by the sender circuit as a signal to begin outpulsing digit information, gate 62 is partially enabled and binary G is reset so that a G′ output is assured. It is fully enabled on the next positive transition in the A wave from oscillator 27. Binary G changes states and its G′ output inhibits gate 62 until the signaling ground SP is removed. However, the changed G output enables the remaining binaries and gates in the encoder. Gate 63 is also enabled by the G output and the output of oscillator 27 is coupled to the clock circuits as wave B, the inverse of wave A as shown in FIG. 6.

The clock, as represented in FIG. 2 by block 29, comprises the four binaries 65 through 68, also designated C, D, E and F for convenience in referring to their complementary outputs, and FB monopulser 70. Each binary has a complementing input I and at least one reset input R. Binary D has two independent resetting inputs R1 and R2. The four binary cells and the feedback loop including the FB monopulser form a countdown circuit. The cells are arranged in a chain with an output of each higher order connected to the complementing input of the next lower order as shown in FIG. 4. In addition each resetting input is controlled by output G of the clock synchronizer. The FB monopulser is driven by the output of coincidence gate 69, which has as inputs the C, D and E′ binary outputs. The binaries would normally count to sixteen without the monopulser, but for the feedback from the FB monopulser to the R1 resetting input of binary D. This feedback forces the clock to repeat every twelve cycles of input wave B in a well known manner. FIG. 6 shows waveform C to be a continuous wave at half the frequency of the B wave, while waveform D is interrupted every other cycle. Waveforms E and F are then one-sixth and one-twelfth the frequency of wave B as shown.

The countdown circuit is insensitive to the B wave until the G lead goes to ground. The outputs of binaries C, D and E control the odd and even sampling gates in a logical fashion as explained below. The outputs of binary F operate on advance relays (not shown) in the sender circuit so that successive digits are set up alternately on even and odd lead sets 22 and 23.

Even and odd sampling gate packages 24 and 25, of which even gates 24 are shown in detail, sample the parallel encoded digits on the digit leads from the sender and serialize them for delivery to oscillator-modulator 30 shown in FIG. 2.

Even sampling gates 24, shown in the dashed-line enclosure, comprise eight coincidence or AND-gates 71 through 76 and 79 and 80, and two buffer or OR-gates 77 and 78. The gates are arranged as shown to limit the number of inputs to any one gate to avoid overloading. Gates 71 through 76 have as inputs connections to successive leads of the even lead set 22. Two additional inputs are provided from the outputs of binaries C and D combined in such a way that each of these gates is enabled for successive five-millisecond intervals in rotation continuously. Gates 71 through 76 are enabled in sequence and sample successively digit leads EV0 through EV10. The outputs are grounds on each gate for which the corresponding digit bit is a ground. The outputs of gates 71 through 73 are applied to buffer gate 77 and the outputs of gates 74 through 76, to buffer gate 78, wherein an inverted output signal is obtained.

A second level of sampling is provided in coincidence gates 79 and 80 which have as inputs the outputs of respective buffer gates 77 and 78. Gates 79 and 80 are alternately enabled by the outputs of binary E during each digit interval. They are enabled in alternate digit intervals by the F′ output of binary F. The second level of sampling increases the actual sampling repetition rate to twelve bits per complete counting cycle.

The odd sampling gates 25 connected to odd lead set 23 from the sender are identical to those in even sampling gates 24, except that the output pair of gates, corresponding to gates 79 and 80, are enabled in alternate digit intervals by the F output of binary F rather than its complementary output F′.

The outputs of both sampling groups are applied to the oscillator-modulator through buffer gate 81 as they occur.

The state of the odd and even lead sets from the sender is diagrammed on the first twelve lines of FIG. 6 for a typical seven-digit call address 775–9971. The sender first sets up the KP digit as an even digit. All but the EV7 lead are at ground. The even leads are sampled sequentially on gates 71 through 76 as determined by the selected outputs of binaries C and D applied thereto. The first three gates are connected to buffer gate 81 through coincidence gate 79 enabled by the E′ output of binary E during the first three bit intervals. The last three gates are similarly connected to the buffer gate during the last three bit intervals through coincidence gate 80, which is enabled by the E′ output of binary E. While the even leads are being sampled for the KP digit the first odd digit is being set up on the odd lead set. This digit is sampled in the next digit interval by the odd sampling gates in the same way. The state of binary F has changed and the second digit is set up on the even lead set. This process is repeated until the sender sets up the ST digit to indicate that the complete call address has been transmitted. The complete data train is shown on the last line of FIG. 6.

*Serial decoder*

Figure 5:
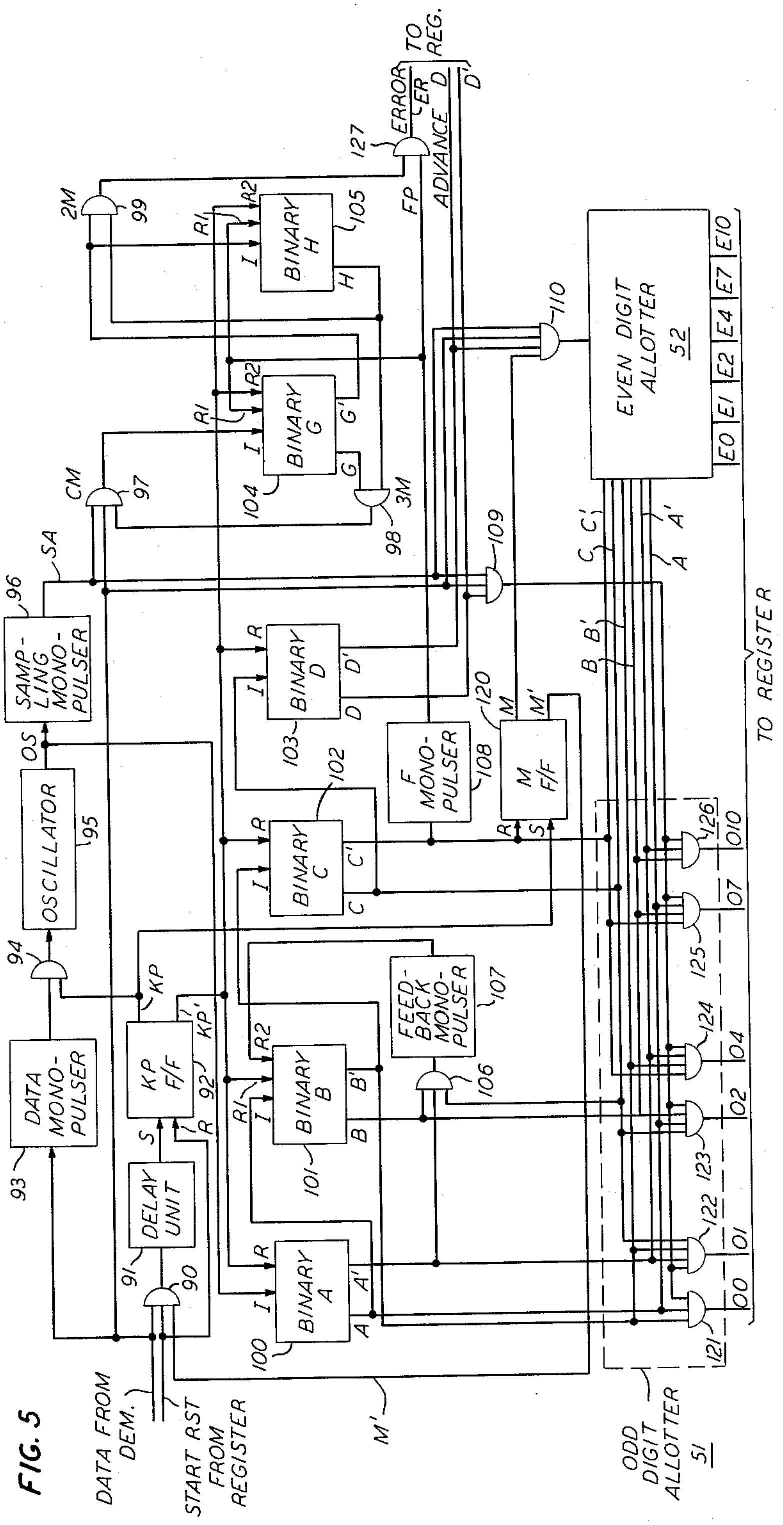
FIG. 5 is a more detailed block schematic diagram of the timing and decoder circuits in the receiving end of the frequency-shift pulsing system of this invention.

The serial decoder in the frequency-shift receiver is shown in more detail in the functional block diagram of FIG. 5. The decoder receives the demodulated data train from the demodulator of FIG. 3 through buffer amplifier 45 on the data lead. It operates on the data train to recognize the KP digit, to synchronize an internal clock, and to distribute the encoded digits to two parallel register input lead sets.

The serial decoder employs the same logic circuit packages, such as binaries, monopulsers and coincidence gates, as are used in the serial encoder. Additionally, a bistable multivibrator or flip-flop circuit is used. The flip-flop is identical to the binary cell previously described, but with the omission of the pulse-steering input arrangement. It includes separate set and reset inputs and will change state only as the input is changed from one type of input to the other.

The serial decoder shown in FIG. 5 comprises a KP detector including coincidence gate 90, delay unit 91 and flip-flop 92; a synchronizer including monopulser 93, coincidence gate 94, oscillator 95 and monopulser 96; a binary counter chain including binaries 100 through 103, coincidence gate 106 and monopulser 107; an error detector including binaries 104 and 105 and coincidence gates 97, 98, 99 and 127, monopulser 108 and flip-flop 120; an odd digit allotter 51 including coincidence gates 121 through 126; and an even digit allotter 52.

The KP digit, which leads the data train for each call address, is received on the data lead from the demodulator and is incident on coincidence gate 90 together with the RST signal from the register. The M' signal also incident on gate 90 inhibits the gate when the remainder of the data train is being sampled. The gate is therefore effectively enabled when the RST signal is received from the register. It will be recalled that the KP digit is headed by four marking bit intervals. Delay unit 91 effectively integrates this interval and produces an output if the marking input is longer than three and a half bit intervals. This is accomplished very readily with a resistance-capacitance time-constant network in a well known manner. The RST signal is also used to reset the KP flip-flop 92, if it was not already in this state. When the delay unit output appears it sets the KP flip-flop, thereby enabling coincidence gate 94. It also removes the resetting KP' signal from the binary counters.

Timing is recovered from the data train by operating data monopulser 93 on each negative-going transition. The first of these occurs at the end of the KP pulse. Oscillator 95 is advantageously a free-running multivibrator producing a square-wave output. An output from the data monopulser readily places the oscillator-multivibrator in a correct reference state and it continues to be free-running with a new reference condition. The OS square-wave output of oscillator 95 drives sampling-pulse monopulser 96 to produce sampling pulse SA once each oscillator cycle.

Oscillator 95 also supplies a drive for the counting chain which comprises binaries A, B, C and D in cascade. Oscillator 95 is connected to the complementing input of binary A. An output of each binary is connected to the complementing input of the next lower order binary. These binaries would normally count down by sixteen but for the feedback arrangement including monopulser 107 between the A' output of binary A and the R2 resetting input of binary B. This is similar to the arrangement found in the encoder of FIG. 4, whereby the counter chain is prematurely reset once each cycle to produce a countdown of twelve rather than sixteen. The outputs of these four binaries are logically combined by the odd and even digit allotters to direct data train samples to appropriate storage relays in the register.

Figure 7:
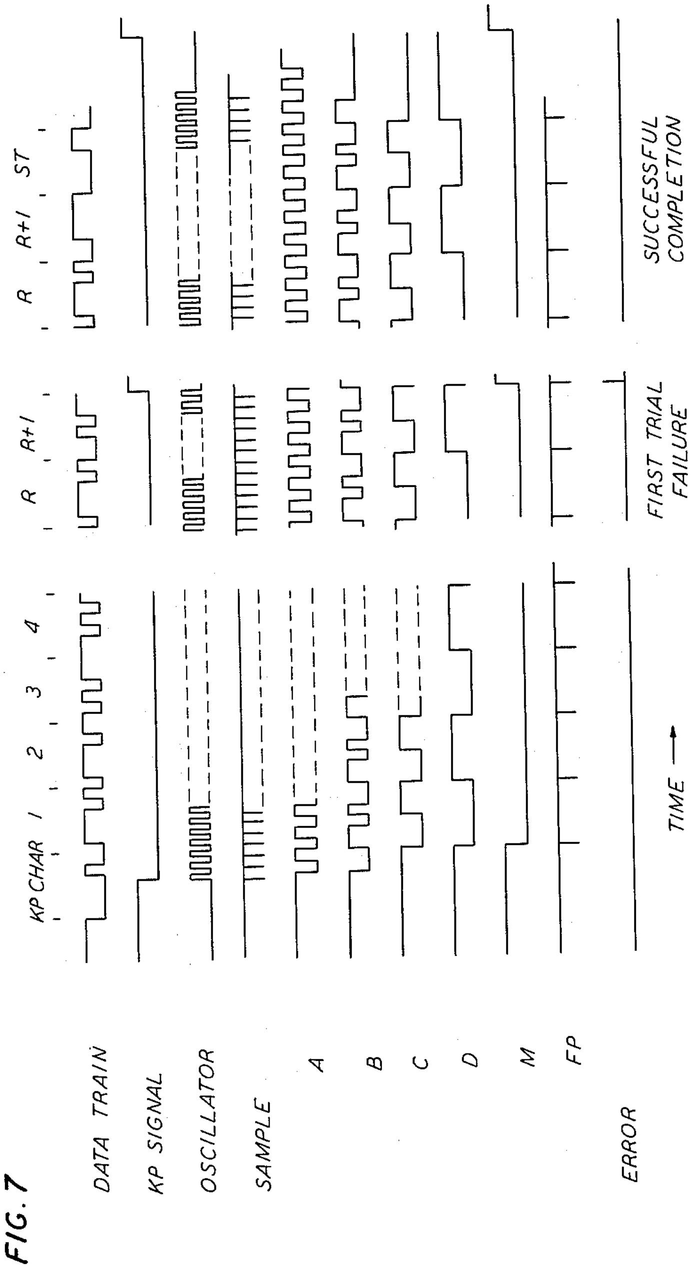
FIG. 7 is a waveform diagram of use in understanding the operation of the decoder shown in FIG. 5.

Odd and even digit allotters 51 and 52 are substantially identical. Only the odd digit allotter is shown in full in FIG. 5. It is seen to comprise six coincidence gates 121 through 126. The gates have outputs designated 00, 01, 02, 04, 07 and 010, indicating the weight relative to an encoded digit assigned to an output on any of these leads, which connect into the register proper. It is apparent from the other inputs to the gates from the binary counters that each gate will be enabled in sequence for a five-millisecond interval. FIG. 7 shows the waveforms in the output of all the binary counters and these waveforms are seen to be similar to those in the serial encoder.

The data train itself is directed to coincidence gates 109 and 110, which also are alternately enabled each digit interval by the D and D' outputs of binary D. The SA output of sampling monopulser 96 is also incident on these gates. An output thus appears for every marking or "one" data bit. The output of gate 109 goes to odd digit allotter 51 and the output of gate 110, to even digit allotter 52. Gate 110 has an additional input from the M output of the M flip-flop which prevents response to the KP digit by the even allotter. The M flip-flop is set by the KP pulse, thus enabling gate 110 to the even digit allotter and disabling gate 90 to the KP digit detector.

The data train is also connected to an error detector counting circuit through coincidence gate 97, also designated CM for "count marks." This detector includes two binary counters 104 and 105, also designated G and H for convenience. Binary G is driven at its complementing input I by the data output of gate 97, which is enabled by the sampling pulse on lead SA and through 3M (three marks) gate 98 when both binaries are reset as is the initial condition. Both R2 reset inputs are actuated when the KP digit is detected. The 3M gate has the usual inverting effect. The G' output of binary G drives the complementing input of binary H. Binaries G and H together can count up to four. The first mark in the digit code sets binary G and has no effect on binary H. The second mark resets binary G and sets binary H. The G' and H outputs enable 2M (two marks) gate 99, whose output in turn enables error gate 127. Gate 127 is sampled at the end of each digit interval by a frame pulse FP from the F monopulser 108, which generates a pulse on each setting of binary C in the counting chain. This coincides with the end of the digit interval as is apparent from the waveforms of FIG. 7. If there is no error, the output of error gate 127 is positive and the register interprets this as a no-error indication. The FP pulse also resets both binaries on the R1 inputs.

On the other hand, if the binaries G and H count to three before the FP pulse arrives, both binaries are in the set state and gate 98 delivers an inhibiting input to gate 97 and the counter output is frozen. Gate 127 then produces a ground output when the FP pulse is applied. The register reacts to this by removing the RST signal, which causes the KP flip-flop to reset and stops further receiver operation. The register also continues keying the signaling tone generator. The continuation of the 2025-cycle signaling tone for a timed interval after the ST digit has been transmitted is interpreted by the sender as a request for retransmission of the complete call address. The frequency-shift receiver is reset, however, and begins to search for the KP digit as part of the retransmitted call address.

This situation is diagrammed on FIG. 7, where the $R+1$ digit is indicated as having three marking bits. The error is detected, the M and KP flip-flops are reset and an error output is produced in coincidence with the FP pulse. The right-hand portion of the waveforms indicates the last three digits received on retransmission. The first five digits are received as before. The $R+1$ digit now includes only two marking bits. The final ST bit is received and delivered to the register. Recognizing the end of the called number the register removes the RST signal and the frequency-shift pulse receiver is returned to its idle state.

*Call-progress signaling*

A novel call-progress signaling method is made possible in a multichannel data trunking system by the combination of the switchhook supervisory signal system described in the Edson et al. patent application cited above and the frequency-shift pulse system of this invention. The particular signaling combination significantly reduces call set-up time and provides a more flexible system. In addition provision is made for requesting an automatic retransmission of any called number which fails a simple validity test at the terminating end of a toll trunking system.

The call-progress signaling sequence described here allows the frequency-shift pulsing system to operate with both telephone and data trunks. It uses both switchhook conditions and in-band tones for passing call-progress information between central offices. The use of this signaling sequence reduces call set-up time and sender and register holding time significantly. It also allows early glare detection, that is, detection of the situation where offices at both ends of a two-way toll trunk attempt a simultaneous seizure. According to present practice the originating trunk goes off-hook when originating a call and the terminating trunk goes off-hook as a start-dial signal. Evidently under this system either trunk can assume it is originating the call. However, no register is connected at either end of the connection and both calls are lost.

The signaling sequences for the situation where no error is detected and the situation where an error is detected will be described.

In the no-error situation the originating trunk circuit at one end of the transmission facility applies an off-hook signal to the M lead upon gaining access to a marker circuit. The M lead signal is sampled in the data carrier terminal and is transmitted in the supervisory signaling band in a time-division sequence with the status of other trunks connected to the same carrier terminal. The terminating end of the transmission facility demodulates the M-lead signal and grounds a corresponding E lead. The terminating trunk circuit remains on-hook, a departure from present practice. It will, however, seize a register. The latter immediately keys the 2025-cycle tone generator in the frequency-shift receiver associated with it as described in this specification. The 2025-cycle tone is recognized in the frequency-shift pulser associated with the originating sender as described in this specification as a start-dial signal. The 2025-cycle tone replaces the presently used direct-current off-hook signal from the terminating office as a start dial signal.

The sender outpulses the call address after a short timed interval and at the same time monitors the incoming 2025-cycle tone. The register removes the 2025-cycle tone on receipt of the ST digit at the end of the called subscriber address when no error is detected in any digit. The terminating trunk does not go off-hook until the called subscriber answers. The originating sender and terminating register are both released together.

In the error situation the signaling sequence is the same as just described except that following the recognition of the ST digit by the register the 2025-cycle tone is not removed and the terminating trunk remains on-hook. The sender times out after a prearranged interval following the ST digit and immediately recycles to retransmit the complete call address from KP to ST digit. The register removes the 2025-cycle tone, after receiving the retransmitted call address digits on the second trial. The sender releases when the on-hook signal is received at the originating trunk circuit on its E lead. In the event of compound errors other timers in the sender and register will eventually set the trunk to reorder in accordance with present practices.

The glare protection is furnished by the fact that only the originating trunk correctly goes off-hook during the call set-up interval. If both trunk circuits go off-hook simultaneously, a glare situation is immediately recognized at each trunk. Steps can then be taken to salvage at least one, and possibly both, of the calls before either marker is released.

While this invention has been described against the background of a particular embodiment of a narrow-band data trunking system, it will be apparent to those skilled in the art that it has general application to the rapid transmission of telephone dialed digits over any trunk circuits, whether narrow-band or full-voice band.

What is claimed is:

1. A signaling system for passing subscriber call addresses over a telephone trunk line comprising a sender at the originating end of said telephone trunk line in which the successive digits of a stored subscriber call address are made available alternately on a pair of parallel lead sets in parallel binary form one digit at a time, a timing wave source, encoding means under the control of said timing wave source for sampling said pairs of sender lead sets alternately to form a serial binary data train representing a complete call address, said encoding means furnishing an advance signal to said sender at the end of each digit to set up a new digit on the lead set just sampled, frequency-shift modulator means keyed by said serial binary data train and having an output connected to said telephone trunk line, a register at the terminating end of said telephone trunk line in which the successive digits of a subscriber call address are received alternately on a pair of parallel lead sets in parallel binary form, frequency-shift demodulator means having an input connected to said telephone trunk line for reconstituting said serial binary data train, means for recovering a timing wave from the reconstituted serial data train, decoding means under the control of the recovered timing wave for allotting successively to the pairs of lead sets in said register the digits in the subscriber call address, said decoding means furnishing an advance signal to said register at the end of each digit to clear the lead set just allotted a digit to receive the next digit, means for performing a validity check on each decoded digit, and means controlled by said check means for signaling said sender circuit over said telephone trunk line to retransmit the complete called number in the event of an invalid digit.

2. In a telephone system, an originating toll central office, a terminating toll central office, a call address sender at said originating office in which called subscriber numbers are stored in a parallel binary code, a call address register at said terminating office accepting subscriber numbers in a parallel binary form on separate input lead sets, a two-way voice transmission facility linking said offices, means connected to said sender for converting the successive digits of a called subscriber number into a synchronous serial binary data train, a frequency-shift oscillator coupled to the originating end of said transmission facility, means for keying said oscillator in accordance with the two states of said serial data train, a frequency-shift demodulator coupled to the terminating end of said transmission facility having as an output a serial binary data train corresponding to that formed in said converting means, means for recovering a timing wave from the serial data train in the output of said demodulator, means under the control of said timing wave for transforming the serial data train in the output of said demodulator digit by digit into parallel form, means for successively connecting said transforming means to the separate input lead sets of said register, a tone generator associated with said register having an output coupled to said transmission facility, means for keying said tone generator when said register is prepared to received subscriber call numbers, and a tone detector associated with said sender and having an input coupled to said transmission facility and an output coupled to said sender as a start-to-send signal.

3. A signaling system comprising a called number digit sender in which alternate digits including a unique start digit appear on different pluralities of leads, means for sequentially translating the states of said different pluralities of leads into serial pulse groups, means for combining said start digit and all the serial pulse groups forming one complete called number into a continuous serial binary pulse train, a narrow-band transmission facility, means for modulating said pulse train as a frequency-shift signal onto said transmission facility for conveyance to a distant point, means at said distant point for demodulating said frequency-shift signal to reform said continuous binary pulse train, a register circuit having different pluralities of digit-storing input leads, means for detecting said start digit,
means under the control of said detecting means for sampling the reformed pulse train to recover the digit pulse groups in parallel form.
means for allotting the recovered digit pulse groups successively to the different pluralities of input leads of said register,
means for error checking said digit pulse groups, and
means under the control of said error checking means for blocking the further allotting of digit pulse groups to said register circuit.

4. A signaling system for a voice telephone transmission facility comprising
a sender in which subscriber call numbers are stored responsive to dial pulses incident thereon,
a pair of sets of parallel output leads for said sender on which successive digits of a called number, a unique start digit and a stop digit are presented in the form of a parallel binary code,
a timing source,
means under the control of said timing source for synchronously sampling first one and then the other of said pair of output lead sets until a binary-coded serial pulse train representing a complete called number is formed,
a frequency-shift modulator,
means for keying said modulator in accordance with the state of the individual pulses in the serial pulse train formed by said sampling means, and
means for coupling said modulator to said telephone transmission system.

5. In a signaling system for a voice telephone transmission facility over which the digits of a called subscriber number are transmitted as a binary data train modulated as a frequency-shift signal on a carrier wave, said binary data train having an equal number of bits per digit including a unique start digit, a receiver comprising
a frequency-shift demodulator connected to said facility for recovering the data train modulated on said frequency-shift signal,
a timing wave oscillator,
means for detecting the unique start digit in said data and having an output signal for controlling the connection of said demodulator to said oscillator,
means for synchronizing said oscillator to the wave transitions in said data train,
means controlled by said oscillator for sampling said data train digit by digit,
a register circuit for accepting the digits of a called subscriber number one after another on two parallel lead sets, and
means also controlled by said oscillator for allotting successive sampled digits to alternate parallel lead sets of said register.

6. A serial encoder for binary-coded multidigit numbers with successive digits presented alternately on separate parallel lead sets in a fixed-length bit code comprising
a timing-wave oscillator,
a plural-stage binary countdown circuit having direct and complementary outputs for each stage,
feedback means for prematurely resetting a stage of said countdown circuit once every counting cycle whereby the overall counting cycle is shortened to correspond to the number of bits per digit,
means connecting said oscillator to drive said countdown circuit whenever a digit is to be outpulsed,
a pair of groups of sampling gates,
means for connecting the separate groups of sampling gates respectively to said parallel lead sets,
means for enabling the separate groups of sampling gates alternately in accordance with the direct and complementary outputs of the last stage of said countdown circuit,
means for enabling the individual sampling gates of each group in sequence each digit period in accordance with the logically combined direct and complementary outputs of the first and second stages of said countdown circuit, each sampling gate having an output corresponding to a single bit in each digit, and
means for combining the outputs of all sampling gates to form a synchronous serial data train encoding binary digits in a complete multidigit number.

7. The serial encoder according to claim 6 in which a second level of selection is provided between the outputs of the individual sampling gates and the combining means in order to reduce the number of parallel inputs to the combining means and avoid overloading comprising
a plurality of buffer gates for combining the outputs of subgroups of sampling gates into single outputs,
a coincidence gate connected to each of said buffer gates, and
means under the control of the direct and complementary outputs of the second last stage of said countdown circuit for enabling said coincidence gates alternately during each digit period.

8. The serial encoder in accordance with claim 7 in which each digit of a multidigit number is encoded as two marking bits out of a six-unit bit code,
said timing-wave oscillator operates at the frequency of the bit rate,
said binary countdown circuit includes four stages, the first stage of which counts down to one-half the oscillator frequency and the second, third and fourth stages under the control of said feedback means count down respectively to one-third, one-sixth and one-twelfth the oscillator frequency,
each group of sampling gates has six gates each,
the first gate of each group is enabled by the concurrent complementary outputs of the first and second stages of said countdown circuit,
the second and fourth gates of each group are enabled by the concurrent direct and complementary outputs of the first and second stages of said countdown circuit, respectively,
the third and fifth gates of each group are enabled by the concurrent complementary and direct outputs of the first and second stages of said countdown circuit, respectively,
the sixth gate of each group is enabled by the concurrent direct outputs of the first and second stages of said countdown circuit,
the coincidence gates driven by said buffer gates are enabled alternately during each digit period by the direct and complementary outputs of the third stage of said countdown circuit,
the groups of sampling gates are enabled alternately every other digit period by the direct and complementary outputs of the fourth stage of said countdown circuit, and
the direct and complementary outputs of the fourth stage of said countdown circuit furnish a signal to set up the next digit on the parallel lead set just sampled.

9. A serial decoder for a serial data train in which complete call addresses are encoded as individual digits of a fixed number of bits each preceded by a unique start digit,
a timing-wave oscillator having an output nominally at the frequency of the bits in said data train,
means for recognizing said start digit and having a triggering output upon such recognition,
means for connecting the triggering output of said recognizing means to said oscillator,
monostable circuit means responsive to transitions in the data train for producing an output for every transition of a preselectel polarity, means for connecting the output of said monostable circuit means to said oscillator to hold it in synchronism with the data train, means coupled to said oscillator for producing a sampling pulse once per cycle of the timing wave, a plural-stage binary countdown circuit having direct and complementary outputs for each stage, feedback means for prematurely resetting a stage of said countdown circuit once every counting cycle whereby the overall counting cycle is shortened to correspond to the number of bits per digit, means connecting said oscillator to drive said countdown circuit whenever the triggering output of said recognizing means is produced, a pair of groups of coincidence gates, each group having a number of gates equal to the number of bits per digit, a register for storing numbers having separate parallel input lead sets, each set having the number of leads equal to the number of bits per digit, means for connecting the respective groups of said coincidence gates to the separate input lead sets of said register, a pair of steering gates for the serial data train each driven by said sampling pulse and enabled alternately by the direct and complementary outputs of the last stage of said countdown circuit and having outputs connected to the respective groups of coincidence gates, and means for enabling the individual coincidence gates in each group of said pair of coincidence gates in sequence in accordance with the logically combined direct and complementary outputs of the first three stages of said countdown circuit, each gate then having an output corresponding to a single bit in each encoded digit of a complete multidigit number.

10. The serial decoder according to claim 9 and an error-checking circuit comprising a pair of binary counting devices having complementing and reset input points and direct and complementary output points, a count-marks coincidence gate, a count-two-marks coincidence gate, a count-three-marks coincidence gate, a monostable circuit driven by said countdown circuit and producing an output at the end of each digit period, means for applying the data train and sampling pulse to said count-marks gate, means for connecting said count-marks gate to the complementing input of one of said binary counting devices, means for connecting the complementary output of said one binary counting device to the complementing input of the other of said binary counting devices whereby said device changes state on alternate changes of state of the one binary counting device, means for connecting the direct outputs of both of said binary counting devices to said count-three-marks gate, means for connecting said count-three-marks gate to said count-marks gate to inhibit the latter gate when the count-three-marks gate is enabled, means for connecting the complementary output of said one binary counting device and the direct output of said other binary counting device to said count-two-marks gate whereby said last-mentioned gate produces an output only when two marking bits are found in said data train, an output gate driven by said count-two-marks gate for giving an error signal when other than two marking bits are counted in the data train in digit interval, and means for applying the output of said monostable circuit to the resetting inputs of both of said binary counting circuits at the end of each digit period.

11. The serial decoder according to claim 9 in which the start digit includes a plurality greater than two of marking bits in succession and said recognizing means comprises a resistor-capacitor time constant circuit which produces said triggering output only after being driven by a marking signal having a duration equal to the period of said plurality of marking bits in start signal.

12. The serial decoder in accordance with claim 9 in which each individual digit is encoded as two marking bits out of a six-unit bit code, said binary countdown circuit includes four stages, the first stage of which counts down to one-half the oscillator frequency and the second, third and fourth stages under the control of said feedback means count down respectively to one-third, one-sixth and one-twelfth the oscillator frequency, there are six coincidence gates in each group thereof, the first gate of each group is enabled by the concurrent direct and complementary outputs of the first and second stages of said countdown circuit, respectively, the second gate of each group is enabled by the concurrent complementary outputs of the first and second stages and the direct output of the third stage of said countdown circuit, the third gate of each group is enabled by the concurrent direct outputs of the first, second and third stages of said countdown circuit, the fourth gate of each group is enabled by the concurrent complementary outputs of the first, second and third stages of said countdown circuit, the fifth gate of each group is enabled by the concurrent direct output of the first and second stages and the complementary output of the third stage of said countdown circuit, the sixth stage of each group is enabled by the concurrent complementary output of the first stage and the direct output of the second stage of said countdown circuit, and the alternate direct and complementary outputs of the fourth stage of said countdown circuit signal said register to clear the lead set just sampled to receive a new digit.

13. In combination, a four-wire two-way telephone trunking facility, a dial-pulse-controlled call address sender connectable to one end of said facility, a dial-pulse register connectable to the other end of said facility, each of said sender and said register respectively presenting or accepting dialed digits in a binary code having $n$-out-of-$x$ marking bits alternately on a pair of lead sets of $x$ leads each, said sender also being capable of generating unique $x$-bit start and stop digits, means associated with said sender for generating a synchronous serial data train from a sequential alternate sampling of the pairs of lead sets in said sender, said data train including $x$ bit intervals per address digit and $x$ additional bit intervals per start and stop digit, means for transmitting said data train as a frequency-shift signal over said trunking facility, means associated with said register for demodulating said frequency-shift signal into a new serial data train, means also associated with said register and responsive to said start digit for generating a timing wave for sampling said new data train $x$ bits at a time, and means responsive to said timing wave for allotting the $x$-bit samples of said new data train alternately to the respective pairs of lead sets in said register.

14. The combination according to claim 13 in which there is associated with said register a tone generator capable of being triggered by said register whenever said register is in condition to accept incoming dialed digits, means for connecting said tone generator to said trunking facility, and there is associated with said sender a tone detector responsive to said tone incoming on said trunking facility for signaling said sender that said register is in condition to accept incoming dialed digits.

15. The combination according to claim 13 in which there is further associated with said registers an odd-even counting circuit for checking the validity of the $n$-out-of-$x$ code for each sampled dialed address digit, said counting circuit producing an error output to said register whenever there are other than $n$ marking bits in any sampled dialed digit.

No references cited.

KATHLEEN H. CLAFFY, *Primary Examiner.*

WILLIAM C. COOPER, *Examiner.*